April 27, 1965

L. A. TOTH 3,180,016

FLUID-OPERATED MOUNTING OR DISMOUNTING RIG FOR TIGHT
FITTED BEARING ASSEMBLIES AND THE LIKE

Filed July 27, 1961

LEO A. TOTH
INVENTOR

BY *Mason, Porter, Miller & Stewart*

ATTORNEYS

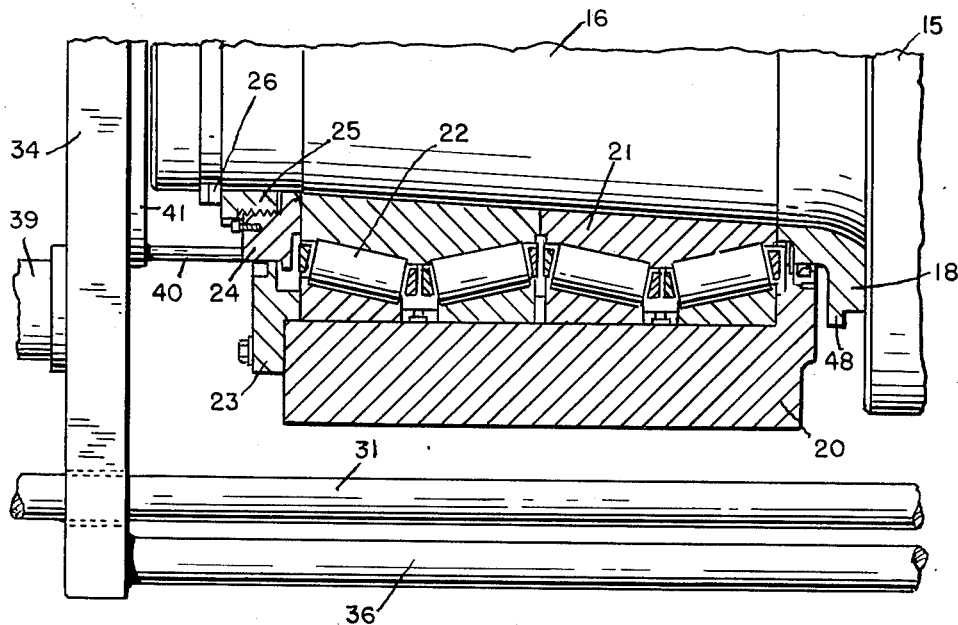
FIG. 2.
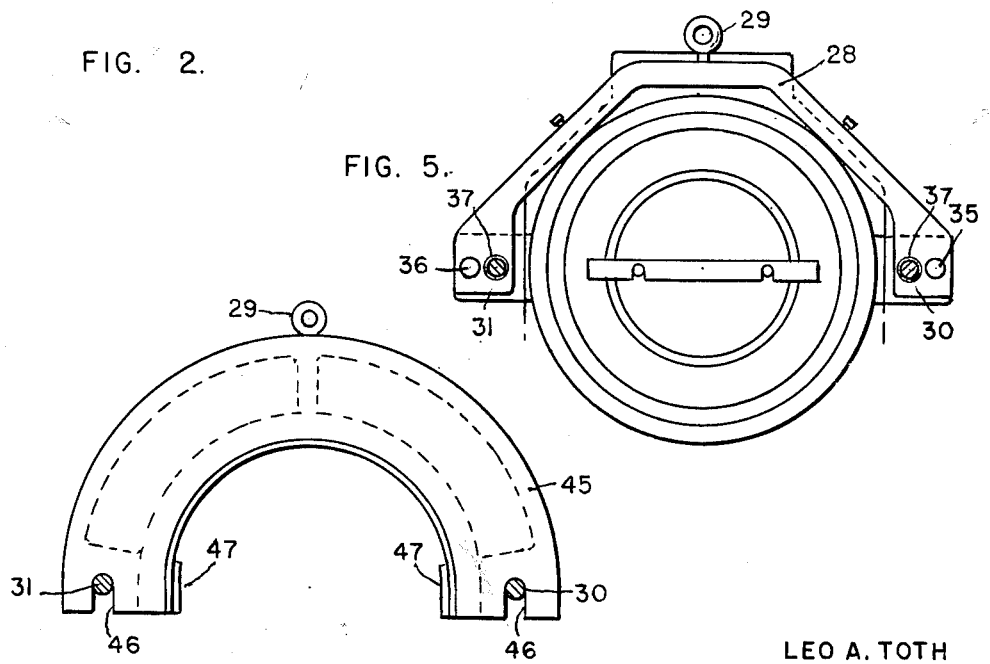
FIG. 5.
FIG. 6.
LEO A. TOTH
INVENTOR
ATTORNEYS

LEO A. TOTH
INVENTOR

LEO A. TOTH
INVENTOR

BY Mason, Porter, Diller & Stewart

ATTORNEYS

LEO A. TOTH
INVENTOR

LEO A. TOTH
INVENTOR

ATTORNEYS

# United States Patent Office 3,180,016
Patented Apr. 27, 1965

3,180,016
FLUID-OPERATED MOUNTING OR DISMOUNTING RIG FOR TIGHT FITTED BEARING ASSEMBLIES AND THE LIKE
Leo A. Toth, South Bend, Ind., assignor to Bantam Bearings Division, The Torrington Company, South Bend, Ind., a corporation of Maine
Filed July 27, 1961, Ser. No. 127,252
3 Claims. (Cl. 29—252)

The following application relates to an improved mounting and dismounting rig for tight fitted bearing assemblies and the like.

Increasing speeds for rolling mills amplify the critical consideration of the application of bearings to the roll necks with the conventional loose fit. The present general practice in the application of antifriction bearings to roll necks is to fit the bore of the bearing loosely on the journals to facilitate their removal from time to time. This may be quite frequent. Where loads are heavy, it is generally required that the rotating race of an antifriction bearing must be fitted tightly to prevent galling or seizing due to the general inability to retain lubrication between the shaft and the bore of the bearing.

The difficulties with roll neck galling and excessive wear may be eliminated by tight fitting of the bearings on the roll neck. In this case, special means are generally provided to mount and remove the bearings from the journal. It is always desirable that the antifriction bearing be a unit assembly for mounting and dismounting in the chuck in which the bearing is mounted.

In many instances of a tight fit of the bearings on the roll necks, the necks have been drilled to provide channels through which hydraulic pressure is applied to the inner race of the antifriction bearing to free it from the roll neck.

It is an object of this invention to provide a mounting means for a unitary antifriction roller bearing on the roll neck without the necessity of drilling the latter and grooving it for the conventional hydraulic method of removal.

It is also an object of this invention to provide a rig which is capable of both fitting the antifriction bearing on the roll neck and also accomplishing its ready removal.

One of the objects of the invention is to provide a rig by which the roller bearings on each end or neck of the mill roll can be tightly mounted simultaneously.

The preferred form and optional modifications of the novel rig are illustrated by way of example in the attached drawings in which:

FIG. 2 is an enlarged fragmentary plan view partly in section of the same showing the left bearing;

FIG. 5 is a vertical section on the line 5—5 on FIG. 1;

FIG. 6 is an elevation of the yoke during removal of the right bearing;

Figure 1:
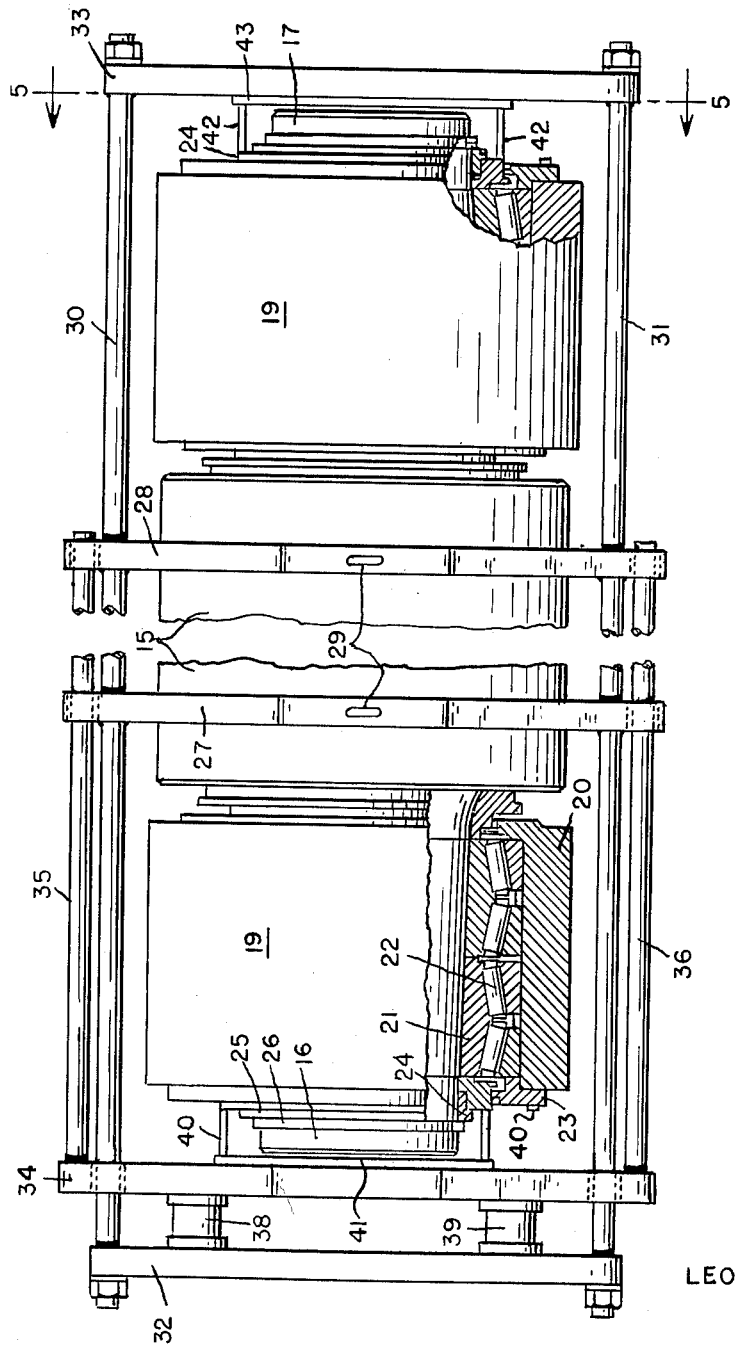
FIG. 1 is a plan view partly in section of the handling rig mounted on the mill roll during simultaneous mounting of bearings on opposite ends of the roll.

The invention comprises a rig which may be fitted into place on a mill roll and manipulated in such a manner as to mount both end bearing assembly units or alternatively to dismount the units singly.

As illustrated, the roll 15 of the rolling mill has tapered necks 16 and 17. An inboard filler ring 18 is fitted over the roll neck fillet of each neck.

The bearing assembly unit 19 consists of an outer race housing 20 and an inner race 21. Several series 22 of bearing rollers are mounted between the inner and outer races. The outer end of the housing has a cover ring 23 by which the outer races of the bearing are clamped in position against a shoulder on the opposite end of the housing.

An outboard filler ring 24 is provided to fit over the cylindrical end of the roll neck and rest against the inner race 21.

A locking ring or expander 25, is also slidable on the same cylindrical surface of the roll neck. The ring is adjustably screwed into the outboard filler ring 24.

The cylindrical end of the roll neck is grooved circumferentially to receive a split ring 26 against which the locking ring may be expanded into final clamping position.

The novel handling rig consists of a frame composed of two saddles 27, 28. These saddles have rings 29, 29 by which they may be lifted and transported, and then the saddles rest upon the mill roll 15.

Side bars 30, 31 pass througuh the saddles parallel to the mill roll and are fastened to the saldies by welding or the like. The side bars extend beyond the ends of the mill roll, as shown in FIG. 1, where the ends are connected by crossbars 32, 33, bolted, welded or otherwise attached to the side bars.

A floating plate 34 is slidably carried upon the side bars 30, 31 and extends across the roll neck. A pair of guide rods 35, 36 are welded or otherwise attached firmly at one end to the floating plate 34. The rods pass slidably through the saddles 27, 28 which latter are provided with transverse holes 37, 37.

A pair of hydraulic rams 38, 39 are mounted with one end diametrically on the crossbar 32. The opposite ends of the rams are mounted on the face of the floating plate 34. These rams will provide simultaneous expansion to separate the crossbar 32 from the floating plate 34 or conversely, to permit them to draw together.

Two presser bars 40, 40 are held in diametric position on the floating plate 34 by means of presser plate 41. The lengths of the bars 40, 40 are such as to permit the floating plate to approach the end of the roll neck in the mounting operation, but without abutting on that end.

The presser bars engage the outboard filler ring 24 and press it and the bearing assembly unit 19 into tight engagement on the tapered neck of the mill roll.

The end crossbar 33 connecting the opposite ends of the side bars 30, 31, is also fitted with a presser plate 43 and presser bars 42, 42. These rest upon the adjacent outboard filler ring 24.

When the presser bars 40—40, 42 and 42 resting against the outboard filler rings 24, 24, expansion of the hydraulic rams will cause the presser bars to rest against the adjacent filler rings 24, 24, thus fitting the bearing units tightly against the inboard filler rings 18, 18. The locking ring 25 is then unscrewed partially from the corresponding outboard filler ring at each end until it abuts firmly against the adjacent split ring 26. The outboard filler ring and locking ring are then fastened together against relative rotation.

The hydraulic rams then being contracted, the floating plate 34 is drawn toward the end crossbar 32 with the guide rods 35, 36 sliding through the holes 37, 37 in the saddles. This results in the presser rods being separated sufficiently to permit the rig to be hoisted by the saddles and removed.

The bearings may be mounted independently by omitting plate 41 and bars 40, 40, allowing floating plate 34 to abut on the end of the roll neck, thus compressing the opposite roller bearing on the neck.

A reversal of this arrangement permits the left end bearing to be mounted independently.

Figure 3:
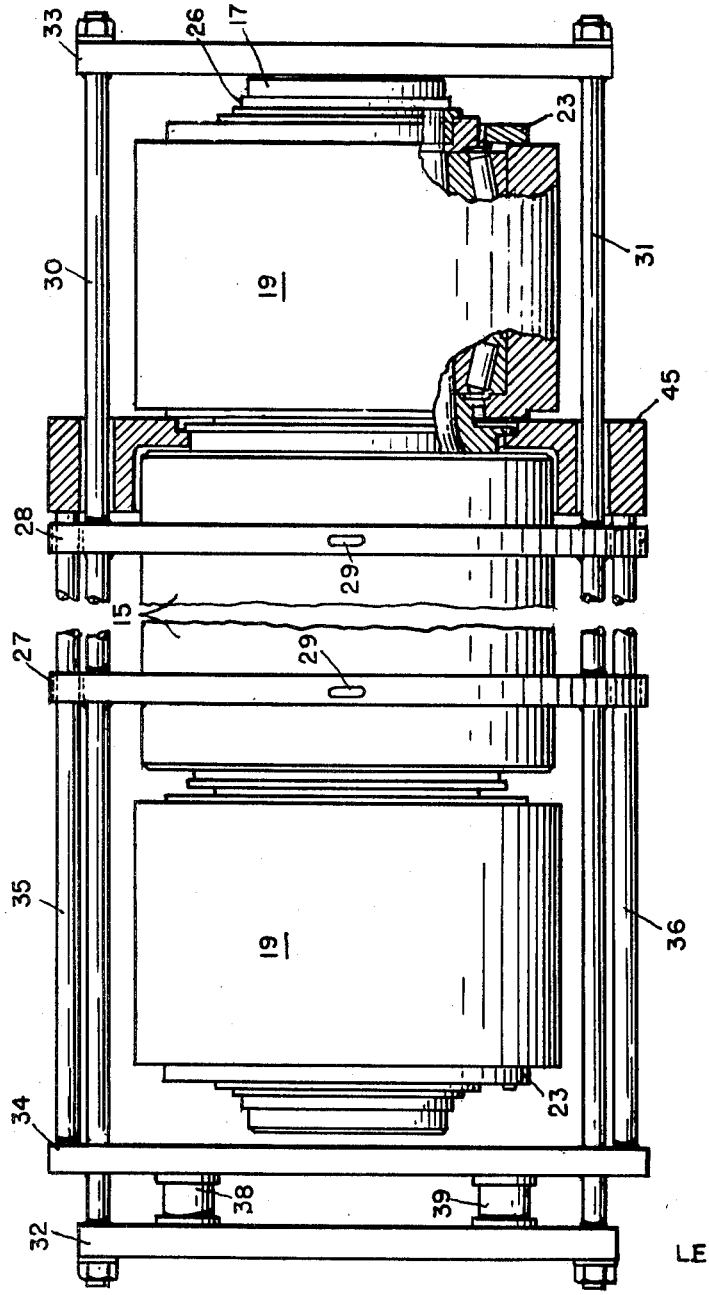
FIG. 3 is a plan view of the same partly in section showing the arrangement for removing the right bearing.
Figure 4:
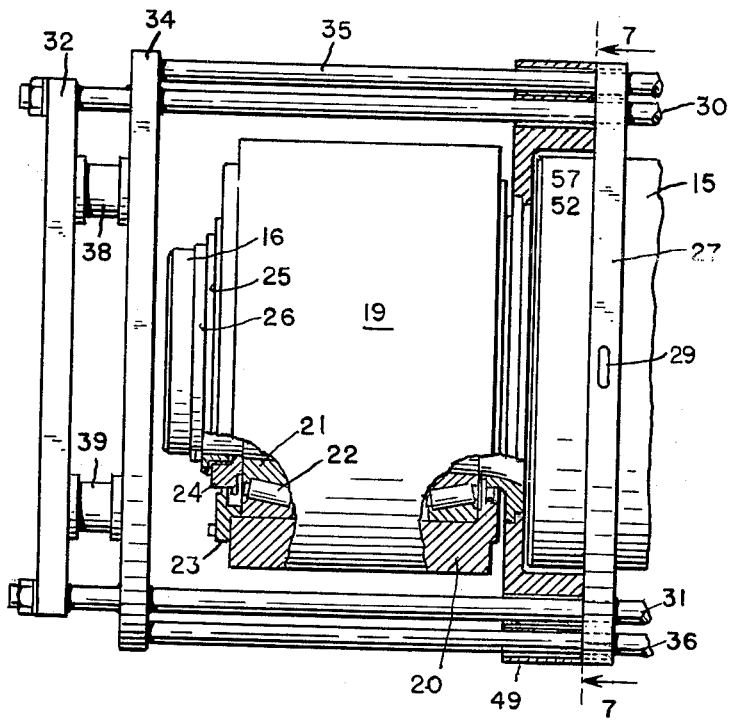
FIG. 4 is a similar view showing the arrangement for removing the left bearing.
Figure 7:
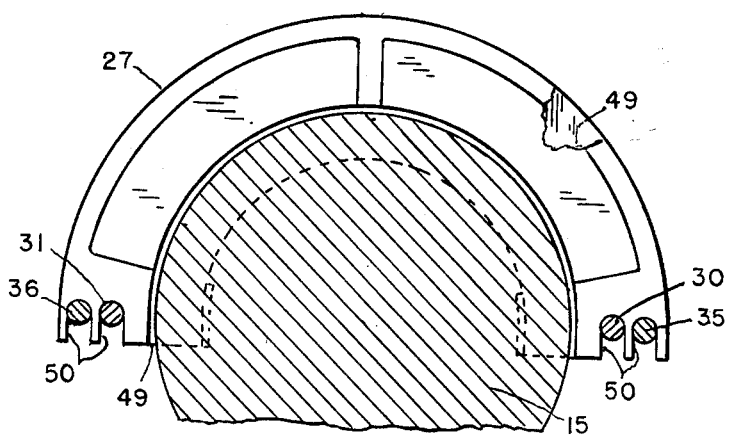
FIG. 7 is an elevation of the yoke during removal of the left bearing.

Removal of the roller bearing unit from the right end of the mill roll is shown in FIGS. 3 and 6. A puller yoke 45 has slots 46, 46 in its ends adapted to receive side bars 30, 31. The yoke is dropped into position on the bars 30, 31 and straddles the mill roll between the roll proper and the bearing unit 19.

The ends of the yoke 45 have inwardly directed tongues 47, 47, (FIGURE 6) which bear upon the ring 48 of the inboard filler ring 18 (FIGURE 2).

In the position for the removal of this roller bearing unit, the crossbar 33 abuts the end 17 of the roll. Expansion of the rams 38, 39 tends to separate the floating plate 34 from the crossbar 32. As the crossbar and the side bars 30 and 31 are held against movement, the floating plate 34 moves toward the adjacent end of the mill roll. In this movement, the guide rods 35, 36 press against the yoke 45 forcibly.

The locking ring 25 is turned inward to provide predetermined clearance between it and the split ring 26. This clearance is sufficient to permit enough end movement of the bearing assembly unit 19 to eliminate the hold between the inner races 21 of the bearing and the neck 16. The hinged split ring 26 is then removed just prior to sliding bearing assembly unit 19 from the roll.

The removal of the bearing unit 19 adjacent the floating plate 34 is accomplished by the use of a removable yoke 49. This also has a pair of slots 50, 50 on each end. Bringing the yoke down upon the mill roll causes the slots 50, 50 to receive the side bars 30, 31 and guide rods 35 and 36, as shown in FIGURE 1. Tongues 51 (FIGURE 10) then engage the rim 52 of the inboard filler ring. Expansion of the compression means 38, 39, brings the floating plate 34 against the end 16 of the roll. Thereafter further expansion causes crossbar 32 to move outwardly, and the saddle 27 will then urge the yoke 49 outward.

Previously, the locking ring 25 has been withdrawn partially into the outboard filler ring 24. The pressure of the yoke 48 against the inboard filler ring 18 breaks the attachment of the inner race 21 to the roll neck 16 and permits the bearing to move into contact with the split ring 26. The latter is then removed.

The bearing assembly unit 19 is thus free for removal as soon as the rig has been lifted away from the mill roll.

Figure 8:
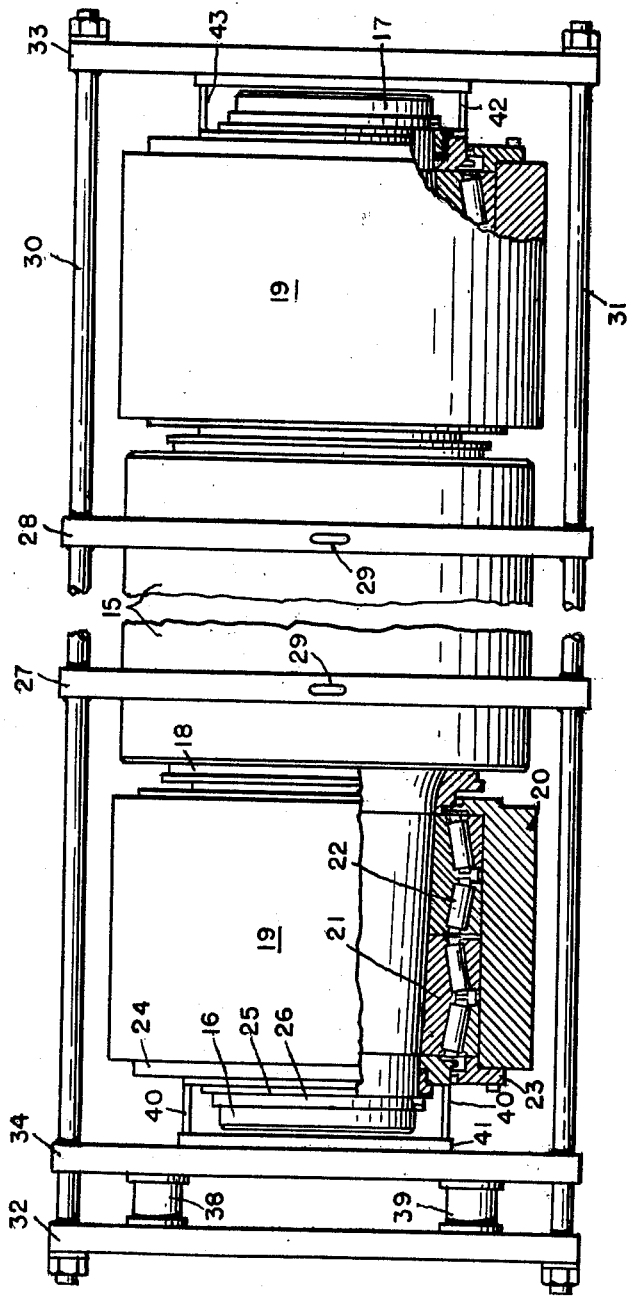
FIG. 8 is a plan view partly in section of a modified form of rig mounted on the mill roll during simultaneous mounting of bearings on opposite ends of the roll.
Figure 9:
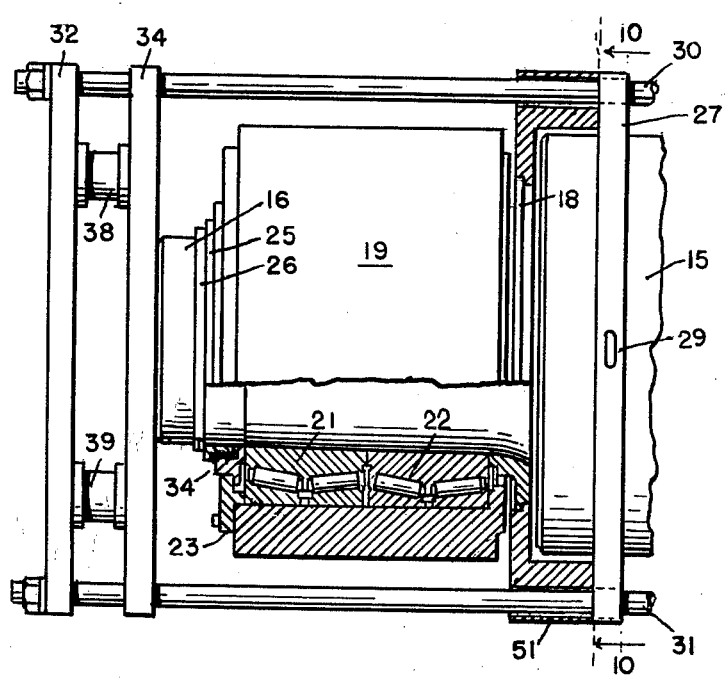
FIG. 9 is a fragmentary plan view partly in section of the left end of the roll during removal of the bearing and FIG. 10 is a vertical section taken on the line 10—10 of FIG. 9.
Figure 10:
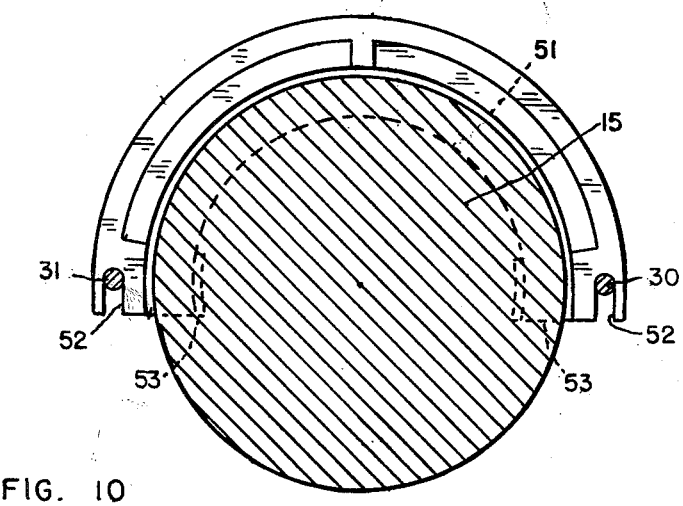

A simple modification of the above invention is also provided in the form illustrated in FIGS. 8, 9 and 10. Here the floating plate 34, while slidable on the side bars 30, 31, does not carry the guide rods 35 and 36.

The pressure bars 40, 42 are drawn together when the rams 38, 39 are expanded, since pressure is applied directly to pressure members 40 and indirectly through the side bars 30, 31 and crossbar 33. The roller bearing assembly units 19, 19 are thus firmly attached. The split ring 26 is applied at each end 16, 17, and the already mounted locking ring 25 is screwed away from the outboard filler ring 24 to bind against the split ring 26 at each end.

In this instance, removal of the bearing assembly unit 19 from the end 16 is accomplished by means of a yoke 51. This has slots 52 which fit over the side bars 30, 31. The yoke 51 rests against the saddle 27. The yoke also has tongues 53 which engage the rim of the inboard filler ring 18, as shown in FIG. 9.

Expansion of the rams 38, 39 brings the floating plate 34 against the end 16. Thereafter further separation moves the crossbar 32 away from the mill roll, and the side bars 30, 31 with the saddle 27 will cause the yoke 51 to free the bearing assembly unit 19 from the end 16.

To accomplish the removal of the bearing assembly unit 19 from the opposite end 17 requires that the rig be reversed in position. The operation of dismounting that roller bearing is then the same as above described.

The rig thus described is relatively simple and capable of transportation and application as desired. It serves both for mounting the roller bearings and dismounting them. It eliminates the use of a hydraulic nut for mounting the bearing. It eliminates the drilling of the roll neck and grooving for the customary hydraulic method of removal.

It is possible also to mount both bearings simultaneously.

The preferred form of the novel rig have been described by way of example. However, numerous changes can be made in the proportions and arrangements of the parts within the scope of the following claims.

What I claim is:

1. A rig for handling the end bearings on a mill roll, comprising two saddles for said roll, two parallel side bars fastened to said saddles on opposite sides of said mill roll, a crossbar connecting the ends of the bars beyond one end of the mill roll, a floating plate slidable on the side bars between the crossbar and the bearing on said roll end, pressure applying means between the plate and the adjacent roll bearing, compression means between said plate and the adjacent crossbar, a second crossbar connecting the opposite ends of the side bars, and means on said second crossbar for applying pressure to the adjacent roll bearing.

2. A rig for handling the end bearings on a mill roll in which the bearings include an inboard filler, said rig comprising two saddles for said roll, two parallel side bars fastened to said saddles on opposite sides of said mill roll, a crossbar connecting the ends of the bars beyond one end of the mill roll, a floating plate slidable on the side bars between the crossbar and the bearing on said roll end, pressure applying means between the cross-bar and said plate and a detachable yoke resting slidably on the side bars and against a saddle and engaging the said inboard filler for releasing it from the end of the mill roll.

3. A rig for handling the end bearings on a mill roll, comprising two saddles for said roll, two parallel side bars fastened to said saddles on opposite sides of said mill roll, a crossbar connecting the ends of the bars beyond one end of the mill roll, a floating plate slidable on the side bars between the crossbar and the bearing on said roll end, two guide rods attached to the floating plate and slidably journaled in the saddles inwardly of the adjacent roll bearing, pressure applying means between the plate and the adjacent roll bearing, compression means between said plate and the adjacent crossbar, a second crossbar connecting the opposite ends of the side bars and means on said second crossbar for applying pressure to the adjacent roll bearing.

References Cited by the Examiner

UNITED STATES PATENTS

| | | | |
|---|---|---|---|
| 845,397 | 2/07 | Cullen et al. | 29—252 |
| 977,018 | 11/10 | Kopietz | 29—260 X |
| 1,268,541 | 6/18 | Benedict | 29—260 X |
| 2,085,529 | 6/37 | Heimbach et al. | |
| 2,228,086 | 1/41 | Rodgers | 29—252 X |
| 2,807,080 | 9/57 | Mathews | 29—251 |
| 2,948,057 | 8/60 | Dagenais | 29—251 X |

WILLIAM FELDMAN, *Primary Examiner.*

NEDWIN BERGER, MYRON C. KRUSE, M. HENSON WOOD, JR., *Examiners.*